Patented May 2, 1939

2,156,891

UNITED STATES PATENT OFFICE 2,156,891

PREPARATION FOR MEDICINAL USE

Bernard L. Wyatt and Harry E. Thompson, Tucson, Ariz., assignors, by mesne assignments, to Armour and Company, Chicago, Ill., a corporation of Illinois No Drawing. Application May 24, 1937,
Serial No. 144,544

12 Claims. (Cl. 167—58)

This invention relates to a preparation for medicinal use and more particularly to a preparation of this character for the treatment of arthritic and fibrositic patients.

Research has shown in cases of arthritis and fibrositis that an analgesia was produced by an intercurrent jaundice with resultant relief from pain and/or a diminution of joint swelling where the patients under observation incurred jaundice during the course of arthritis of fibrositis.

The importance of this observation has led to experiment in the production of jaundice in such patients with an object of the eventual use of jaundice as a therapeutic agent.

Jaundice (icterus) is due to the presence of the coloring matter of the bile or other pigments in the blood and tissues in certain amounts and is caused either by obstruction of the biliary passages, the action of chemical or bacterial poisons upon the liver, the excessive destruction of red blood cells, etc.; or may be induced as a therapeutic measure by repeated injections of bile or other pigments in combination with bile acids or alkali metal salts thereof.

Bile contains components which may be divided into five groups: (1) inorganic salts and sodium carbonate; (2) bile pigments such as bilirubin, biliverdin, and biliprasin; (3) bile salts; (4) lipoid constituents; and (5) mucin.

Of these groups bile pigments and bile salts are found in relatively large quantities in the circulatory blood in jaundice of the obstructive type, while in jaundice of the hemolytic type no great alteration of the bile salts content of the blood is present.

We have discovered that experimental jaundice (hyperbilirubinemia) may be induced by repeated intravenous injections of the preparation hereinafter described with resultant analgesic and remedial effects upon cases of arthritis and fibrositis.

Bile pigments, such as bilirubin, biliverdin, and biliprasin or their derivatives are combined either chemically or otherwise with bile acids, including those occurring naturally or synthetically such as cholic, glycocholic, taurocholic, dehydrocholic, mono, di and triketocholic, or mixtures of these acids or the metal salts of such acids. These salts include the group of sodium, potassium, magnesium, and calcium or other salts of metals. The combination of these ingredients may take place alone or in an alkaline solution using the carbonates or hydroxides of sodium, potassium or other alkali, the alkalinity being of wide range as to pH. The combination may also be effected alone or in an acid solution using organic or inorganic acids, the acidity being of wide range as to pH and the acid selection dependent upon circumstances. Bilirubin at the present time is believed to be the bile pigment for most effective use in connection with this invention.

The process of preparation involves filtration, precipitation or similar procedure to facilitate a chemical or other combination or mixture of bile pigment with bile acids or their salts either in solution or as a dry substance.

A specific example of preparation is as follows:

Using as bile pigment, bilirubin, two-tenths to one gram is dissolved in from 10 to 300 cc., one-tenth normal solution of sodium carbonate, the mixture being heated for a short time under centigrade boiling point. The resultant solution or mixture is filtered and the pH thereof determined and adjusted. To this is added a solution of bile acid such as the sodium salt of dehydrocholic acid in the ratio of one-half to ten cc. of the sodium salt in a 20% finished solution or its equivalent amount in dry form.

This is done under conditions which minimize or eliminate oxidative or reductive changes in the bilirubin. The bile pigment is tested for color value by the Ernst-Förster or Peterman-Cooley tests, a 90% tinctorial value having been found desirable. An inorganic acid, for this example, hydrochloric, may be added to the solution as a means of pH adjustment. A pH of 9.4 has been determined as suitable, but such pH is not definite and depends upon conditions pertaining to the preparation of the product.

If the product is desired in dry form, it may be so prepared by evaporation or other means.

Bile pigments are amphoteric and essentially non-toxic and may be used for human dosage; being amphoteric they readily combine in either the alkaline or acid preparations and thus produce effects which are different from those that result when either is administered singly.

It is obvious that if biliverdin is used, the biliverdinate is formed in the first step, while in the intermediate steps substitution of other bile acids or their salts will give other results, as for instance if taurocholic acid salts be used, the result is a potassium or sodium taurocholate, a similar substitution being the metal salts of ketocholic acids.

Tests of this preparation upon rabbits has determined that jaundice may be induced and maintained with repeated intravenous injections of from 10 to 20 mgs. per kilo of body weight of the rabbits. A single fatal dose was determined to be 175 to 200 mgs. per kilo of body weight.

Tests upon patients with intravenous injection of bile or other body fluid pigments alone have given no beneficial effect in arthritis or fibrositis and only slight degrees of jaundice were induced. By dosage sufficient to maintain a bile pigment at an elevated level with the preparation described herein, patients secured relief from pain within a short time after treatment and/or diminution of joint or other swelling occurred. These results were due to the induced jaundice caused by the repeated injections of our preparation.

The use of our preparation has also given an inhibitory effect in streptococci diseases.

We claim:

1. A preparation for medicinal use for the treatment of arthritis and fibrositis comprising a bile pigment and one of the class consisting of bile acids and salts of bile acids.

2. A preparation for medicinal use for the treatment of arthritis and fibrositis comprising a bile pigment and one of the class consisting of bile acids and salts of bile acids and an alkali.

3. A preparation for intravenous use comprising a bile pigment, a salt of a bile acid, and an alkali combined in solution.

4. A preparation for intravenous use comprising a bile pigment, a salt of a bile acid, and an acid other than said bile acid combined in solution.

5. A preparation for intravenous use comprising a bile pigment, a salt of a bile acid, and an organic acid other than said bile acid combined in solution.

6. A preparation for intravenous use comprising a bile pigment, a salt of a bile acid, and an inorganic acid other than said bile acid combined in solution.

7. A preparation for the treatment of arthritis and fibrositis comprising bile pigment, bile acid, and an alkali combined to form an intravenous injection for inducing jaundice or hyperbilirubinemia.

8. A preparation for the treatment of arthritis and fibrositis comprising bile pigment, bile acid, and an acid other than said bile acid combined to form an intravenous injection for inducing jaundice or hyperbilirubinemia.

9. A preparation for intravenous use comprising a bile pigment and a bile acid.

10. A preparation for intravenous use comprising a bile pigment and a salt of a bile acid.

11. A preparation for medicinal use for the treatment of arthritis and fibrositis comprising bilirubin and one of the class consisting of bile acids and salts of bile acids.

12. A preparation for medicinal use for the treatment of arthritis and fibrositis comprising bilirubin and one of the class consisting of bile acids and salts of bile acids and an alkali.

BERNARD L. WYATT.
HARRY E. THOMPSON.